(12) United States Patent
Balasubramanian et al.

(10) Patent No.: US 6,381,037 B1
(45) Date of Patent: Apr. 30, 2002

(54) DYNAMIC CREATION OF COLOR TEST PATTERNS FOR IMPROVED COLOR CALIBRATION

(75) Inventors: Thyagarajan Balasubramanian; Reiner Eschbach; Paul G. Roetling, all of Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/340,884

(22) Filed: Jun. 28, 1999

(51) Int. Cl.[7] .............................. G03F 3/08; H04N 1/46
(52) U.S. Cl. ...................... 358/3.23; 358/522; 358/523; 358/504
(58) Field of Search .............................. 358/3.23, 518, 358/519, 521, 522, 534, 536, 538, 523, 524, 504; 382/162, 167, 168, 169, 170

(56) References Cited

U.S. PATENT DOCUMENTS

| | | | |
|---|---|---|---|
| 2,790,844 A | 4/1957 | Neugebauer | 178/518 |
| 4,275,413 A | 6/1981 | Sakamoto et al. | 358/525 |
| 4,500,919 A | 2/1985 | Schreiber | 358/518 |
| 5,305,119 A | 4/1994 | Rolleston et al. | 358/518 |
| 5,416,613 A | 5/1995 | Rolleston et al. | 358/518 |
| 5,471,324 A | 11/1995 | Rolleston | 358/518 |
| 5,483,360 A | 1/1996 | Rolleston et al. | 358/518 |
| 5,649,072 A | 7/1997 | Balasubramanian | 358/518 |
| 5,649,073 A * | 7/1997 | Knox et al. | 358/1.9 |
| 5,734,802 A | 3/1998 | Maltz et al. | 358/518 |
| 5,739,927 A | 4/1998 | Balasubramanian | 358/518 |
| 5,760,913 A * | 6/1998 | Falk | 358/523 |
| 5,818,960 A * | 10/1998 | Gregory, Jr. et al. | 358/523 |
| 5,832,109 A * | 11/1998 | Mahy | 358/518 |
| 6,141,120 A * | 10/2000 | Falk | 358/518 |

OTHER PUBLICATIONS

Po–Chieh Hung, "COlorimetric Calibration for Scanners and Media", SPIE, vol. 1448, Camera and Input Scanner System (1991).

* cited by examiner

*Primary Examiner*—Kimberly A. Williams
(74) *Attorney, Agent, or Firm*—Mark Costello

(57) ABSTRACT

A method for calibrating a printer includes printing a first set of color samples with the printer, reflecting at least a portion of the printer gamut. Each printed color sample in the set of samples is measured calorimetrically, to determine the printer's response thereto. The colorimetric response is compared with a predictive model of printer behavior for that portion of the printer gamut. In a portion of the printer gamut wherein the calorimetric response differs from predicted printer behavior, the printer generates a new set of color samples, for printing. The new set of color samples is secondarily measured to determine the printer's colorimetric response thereto; and using the initial measurements and the secondary measurements, a color calibration table is generated for use by the printer in converting device independent colors to device dependent colors.

19 Claims, 5 Drawing Sheets

DYNAMIC CREATION OF COLOR TEST PATTERNS FOR IMPROVED COLOR CALIBRATION

The present invention is directed to printer color calibration techniques, for determining printer response to input images, and more particularly, to a method of automatically creating color test patterns for selected areas of the color gamut in which improved calibration is required.

CROSS REFERENCE

Cross-reference is made to concurrently filed patent application 09/340848 by T. Balasubramanian, R. Eschbach and P. Roetling.

BACKGROUND OF THE INVENTION

The generation of color documents can be thought of as a two step problem: first, the generation of an image, for example, by scanning an original document with a color image input terminal or scanner, or creation of a color image on a work station operated in accordance with a color image creation program; and second, printing of that image with a color printer in accordance with colors defined by the scanner or computer generated image.

The problem is that scanner and computer program output is commonly provided in a color space of tristimulus appearance values, i.e., RGB (red-green-blue). Commonly, these values are a transformation of the standard XYZ coordinates of CIE color space. Color descriptions that can be uniquely and analytically transformed to XYZ are commonly referred to as, "device independent".

Printers, however, commonly have an output that is defined as existing in a colorant-defined color space called CMYK (cyan-magenta-yellow-key or black) which is uniquely defined for the printer by its capabilities and colorants. Printers operate by the addition of multiple layers of ink or colorant in layers to a page. The response of the printer tends to be relatively non-linear. Colors are defined for a particular device, and accordingly reference is made to the information as being "device dependent". Thus, while a printer receives information in a device independent color space, it must convert that information into a device dependent color space for printing, which reflects the gamut or possible range of colors of the printer. Printers may print with colorant beyond CMYK, for a variety of special purposes or to extend the device gamut.

The desirability of operating in a device independent color space with subsequent conversion to a device dependent color space is well known, as shown by U.S. Pat. No. 4,500,919 to Schreiber, U.S. Pat. No. 2,790,844 to Neugebauer, and U.S. Pat. No. 4,275,413 to Sakamoto and others. There are many methods of conversion between color spaces, all of which begin with the measurement of printer response to certain input values. Commonly, a printer is driven with a set of input values reflecting color samples throughout the printer gamut. Subsequently, the calorimetric response of the printers to the input value is measured, so that printed colors are mapped to device independent values. A table, mapping printer output values to colorimetric input values can be created.

In U.S. Pat. No. 4,275,413 to Sakamoto, the information derived is placed into look up tables, stored in a memory, perhaps ROM memory or RAM memory where the look up table relates input color space to output color space. The look up table is commonly a three-dimensional table since color is defined with three variables. In RGB space, at a scanner or computer, space can be defined as three-dimensional with black at the origin of a three dimensional coordinate system 0, 0, 0. White is represented at the maximum of a three dimensional coordinate system which in an 8-bit system, would be located at 255, 255, 255. Each of the three axes radiating from the origin point therefore respectively defines red, green, and blue. In the 8-bit system suggested, there will be, however, over 16 million possible colors ($256^3$). There are clearly too many values for a 1:1 mapping of RGB to CMY, CMYK or any other device dependent color space. Therefore, the look up tables provide a set of node values which could be said to be the intersections for corners of a set of colors distributed through the gamut of the input device. Colors falling within each three dimensional volume defined by a set of nodes can be interpolated from the node values, through many methods including tri-linear interpolation, tetrahedral interpolation, polynomial interpolation, linear interpolation, and any other interpolation method depending on the desired accuracy of the result. U.S. Pat. No. 5,483,360 to Rolleston, U.S. Pat. No. 5,649,072 to Balasubramanian, U.S. Pat. No. 5,739,927 to Maltz and Balasubramanian and U.S. Pat. No. 5,734,802 to Harrington et al. all provide further details regarding table construction. Calibration table construction is a time consuming process, due to the large number of samples that must be printed, scanned and evaluated. All of the immediately above patents note the problem that, after a change in process parameters due to time, change of materials, refilling toner, component aging, etc., a change in calibration is required, but perhaps only in a portion of the overall color gamut of a printer.

In addition to the problems of drifting or changing parameter, the actual creation of a table can create problems. For example, colors, or halftones in portions of the printer gamut that stress the printer, might display "noise" in their creation. Such noise produces inaccuracies in the table. If table calibration is based on such inaccuracies, the reproduction system will not work properly.

Models of printer behavior are often created to attempt to predict printer response. The use of such models, if accurate, could greatly simplify calibration. However, noise in the calibration process renders the models difficult to apply. One particular printer model is referred to as the Neugebauer model (Yule, "Principles of Color Reproduction", John Wiley & Sons, 1967) that assumes that the color of the output print is a weighted average of a set of primary colors and white paper. The model describes the primary colors as overprinted masses of colorants C, M, Y, K. The model assumes an ideal printer for each primary color.

Recalibration of the entire space is costly in terms of processing time. It is desirable to only recalibrate a portion of the color space, or alternatively, to use the best portions of the color space mapping. It may also be desirable to improve the response in certain portions of the color space, perhaps by providing more sample information. In any case, there is often a need to provide a set of additional samples for calibration table generation or regeneration.

The references cited herein are incorporated by reference for their teachings.

SUMMARY OF THE INVENTION

In accordance with the invention, there is provided a method and apparatus for dynamically creating color calibration patterns based on comparison of calibration results with printer models. Color patterns for calibration are created to optimize calibration based on a selected printer model and comparisons to actual physical measurements.

In accordance with one aspect of the invention, there is provided a method for calibrating a printer comprising: printing a first set of color samples with said printer selected to reflect at least a portion of a printer gamut; initially measuring each printed color sample in said set to determine said printer's colorimetric response thereto; comparing said calorimetric response with a predictive model of printer behavior for said printer gamut; for at least one portion of said calorimetric response which differs from predicted printer behavior, generating a new set of color samples, reflecting said portion of said calorimetric response, for printing by said printer; secondarily measuring each of said printed new set of color samples set to determine said printer's calorimetric response thereto; using said initial measurements and said secondary measurements to generate a color calibration table for use by said printer in converting device independent colors to device dependent colors. Here, we use the term printer model to comprehend predictive models, whether they are in analytical, numerical or any other implementable form.

In accordance with another aspect of the invention, there is provided a method of calibrating a printer by printing a first set of color samples representative of at least a portion of a printer gamut; comparing said first set of color samples with a predictive model of printer behavior for said portion of said printer gamut; generating a new set of color samples in areas where a difference between said first set of color and said predictive model is greater than desired; and using said first set of color samples and said new set of color samples to calibrate said printer.

The invention allows a reduction in the effort needed to calibrate a printer, and a reduced need for expert intervention in the calibration process.

In practice an initial color calibration pattern is generated, printed and measured. As always, there is noise in the measurement and there are printer non-uniformities. After the first sheet is measured, the user has the option to use the current calibration or to fine-tune the calibration. At this stage, the dynamic creation comes into play. When the initial measurement is analyzed, the system determines problematic areas by comparison of the measurements with a printer model. A simple way to do this is to determine the change in gradient in color space of the calibration function as compared to an expected performance, or the change in curvature of the calibration function. This gives a strong indication of problems caused from noise (noise will introduce local deviations from a smooth behavior), and/or problems caused by printer halftoning problems. A dynamically generated calibration sheet will include more color patches in the appropriate region to either eliminate observed noise or improve the printer modeling. At the same time, the number of patches in smooth color space regions (estimated from the initial measurement) is reduced, thereby increasing the overall calibration efficiency. The invention may take form in various components and arrangements of components, and in various steps and arrangements of steps. The drawings are only for purposes of illustrating a preferred embodiment and are not to be construed as limiting the invention:

Figure 1:
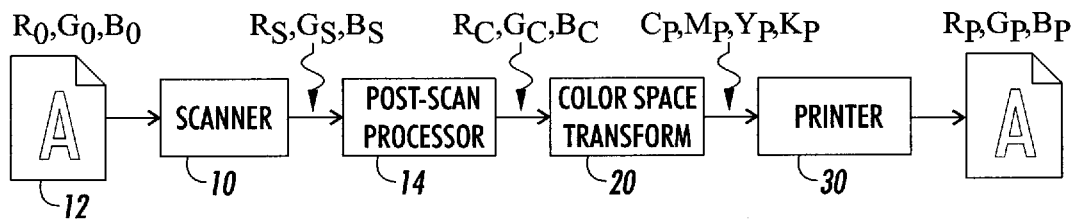
FIG. 1 illustrates a printing system in which the present invention finds advantage.
Figure 3:
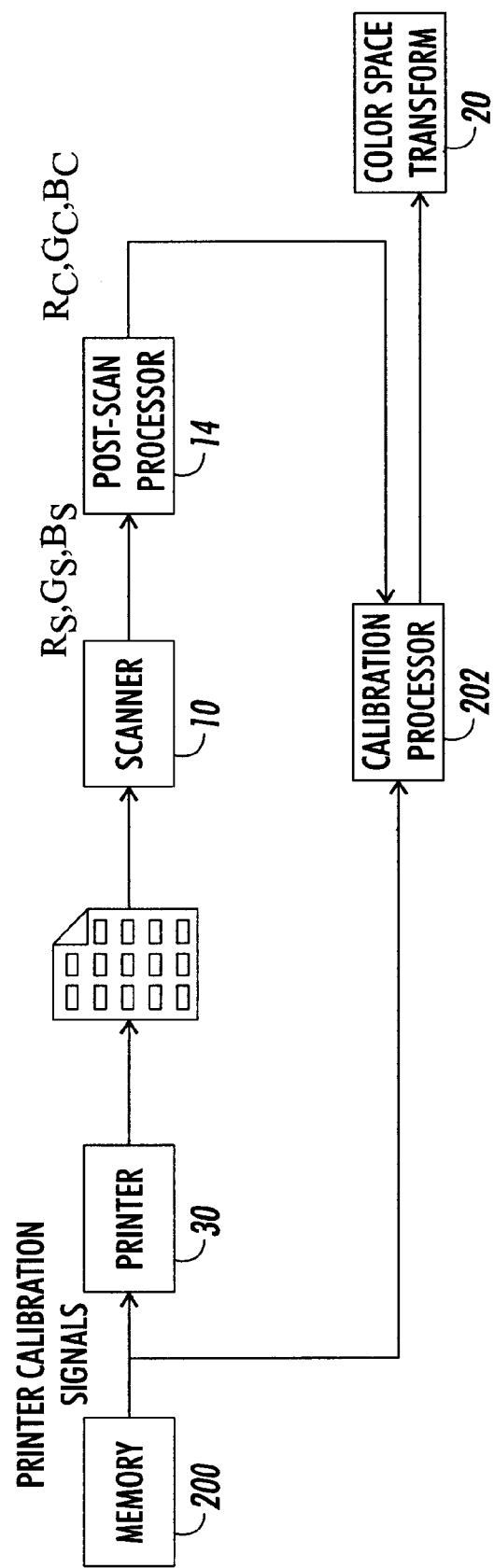
Figure 4C:
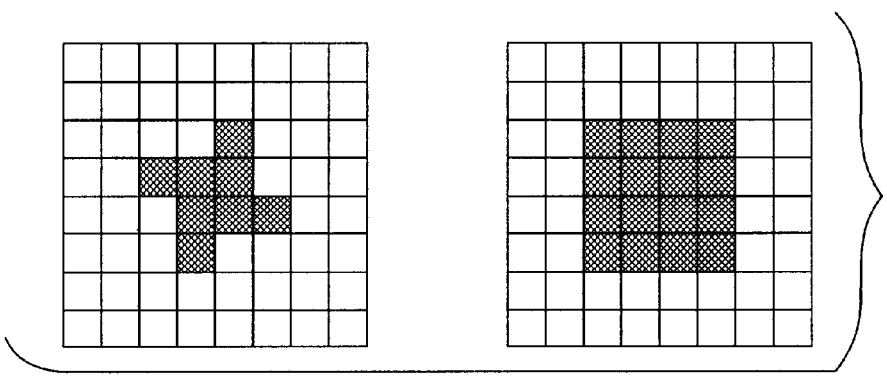
Figure 4B:
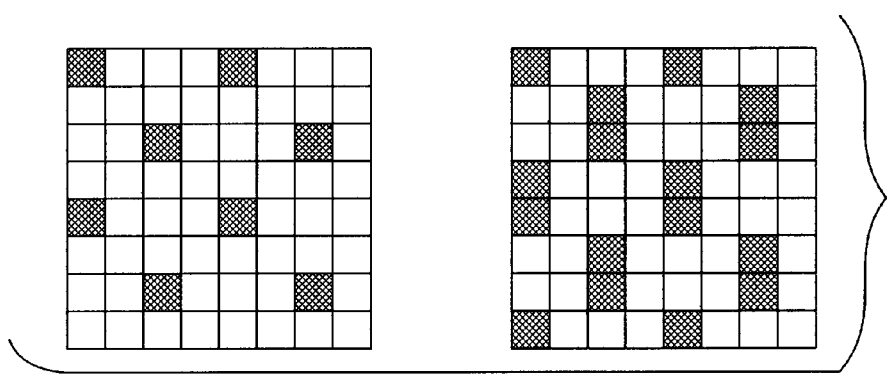
Figure 4A:
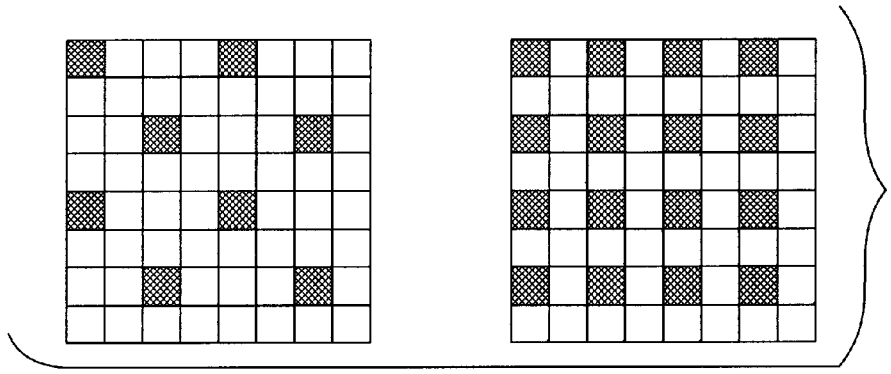
Figure 5:
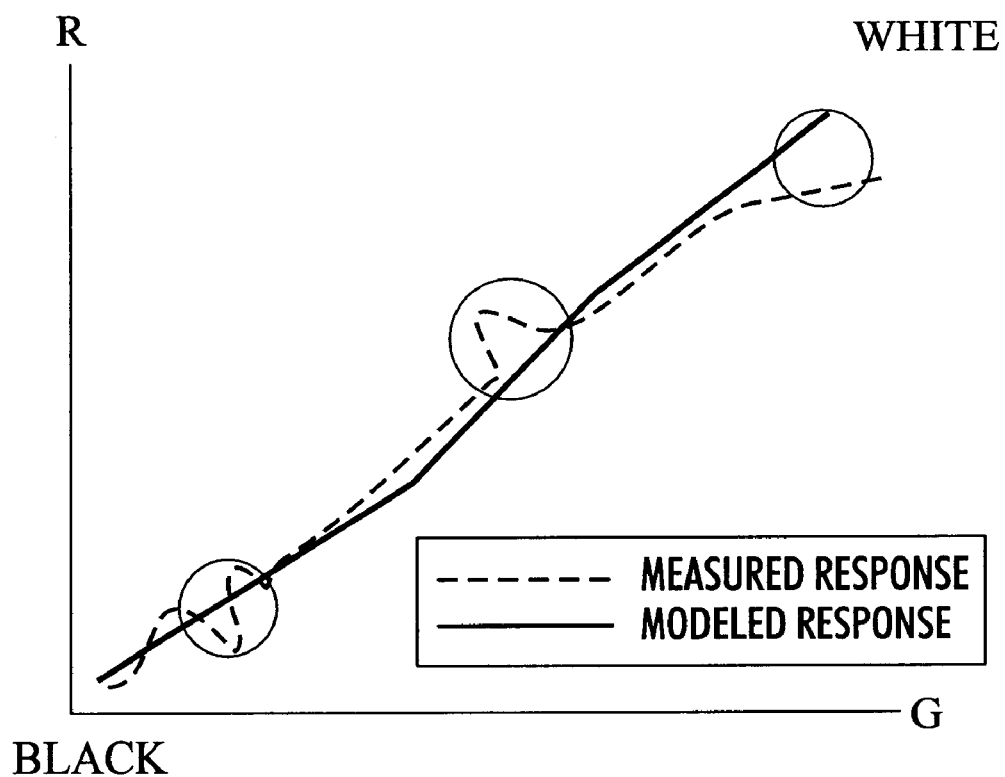
Figure 6:
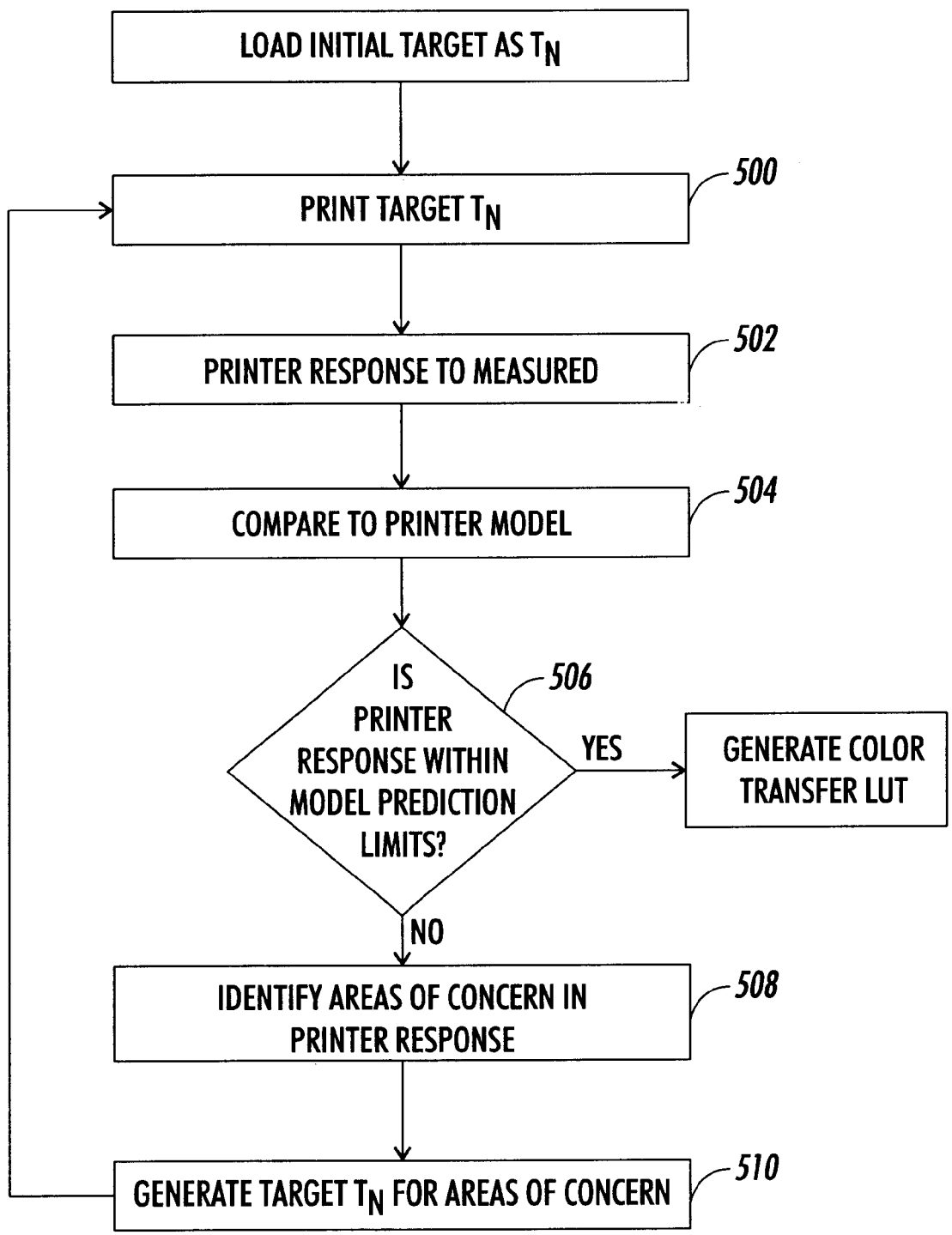

FIG. 3 provides a function block diagram of the calibration process, as it might be implemented for a system like FIG. 1;

FIGS. 4A, 4B and 4C illustrate the case where variable print setting parameters are used in the generation of the initial or later calibration sheet;

FIG. 5 shows a graphic example for the deviation between modeled and measured printer response; and FIG. 6 shows a flowchart explaining the processing steps of the iterative method.

Referring now to the drawings where the showings are for the purpose of describing an embodiment of the invention and not for limiting same, a basic system for carrying out the present invention is shown in FIG. 1. In such a system, a scanner 10, such as perhaps the color scanner available in Xerox 5790 digital color copiers, can be calibrated to produce a set of digital colorimetric or device independent data. An original image 12 rendered in colors $R_0$, $G_0$, $B_0$, which, by definition, can be defined in terms of a colorimetric R,G,B (red-green-blue) space, is fed into the scanner, resulting in a set of scanner image signals $R_s$, $G_s$, $B_s$, defined in device dependent scanner terms. Incorporated into the scanner or another processing path is a post-scanning processor 14, which uses the scanner calibration transform to provide a correction of scanner image signals $R_s$, $G_s$, $B_s$ to colorimetric terms, $R_c$, $G_c$, $B_c$, usually digital in nature. The values may be in terms of CIE color space (rgb), or the L*,a*,b, or luminance-chrominance space (L,$C_1$,C2) or a linear transform thereof.

A color space transform, indicated by block 20, is used to convert the device independent data to device dependent data. The output of color space transform 20 is the image defined in terms of a device dependent space, or printer colorant signals $C_p$, $M_p$, $Y_p$, $K_p$ that will be used to drive a printer 30. In one possible example, the colorant signals represent the amounts of cyan, magenta, yellow, and black toners to be deposited over a given area in an electrophotographic printer. The printed output image may be said to be defined in terms of $R_p$, $G_p$, $B_p$, a measured response, that is hoped to have a relationship with $R_0$, $G_0$, $B_0$ such that the printed output image has a color that is colorimetrically similar to the original image, although that similarity is ultimately dependent upon the gamut of the printing device.

When referring to colorimetric spaces, the reference is to color space definitions that are transforms of CIE XYZ space (1931). When we refer to device dependent space, we refer to a color space that is defined only in terms of operation of the device using it. While many color spaces have three dimensions, it is possible to have color spaces with less than three dimensions or more than three dimensions and likewise, it is possible for printers to use less than three colorants or more than four colorants.

Figure 2:
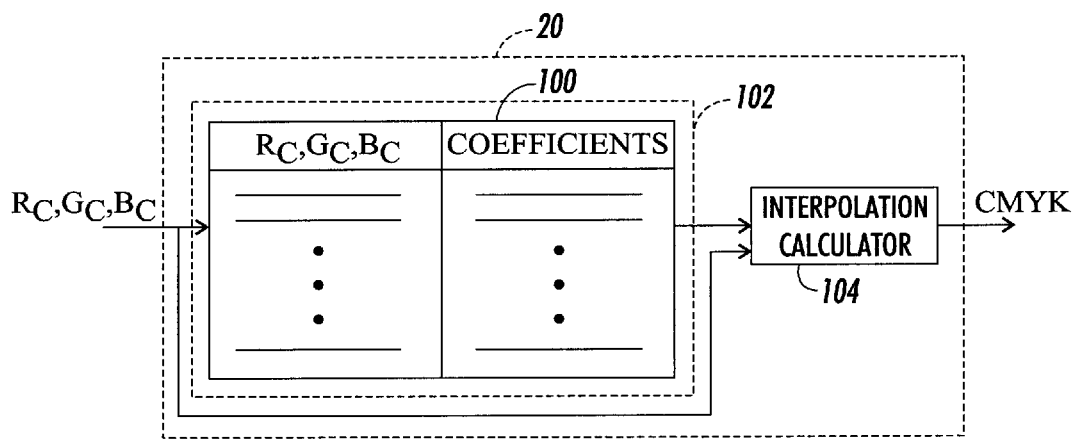
FIG. 2 illustrates a portion of the calibration system in a system like FIG. 1.

With reference now to FIG. 2, color space transform 20, initially receives $R_c$, $G_c$, $B_c$ color signals. These signals are directed to the interpolation calculator along with the lookup table 100 stored in memory 102. This arrangement provides a three-dimensional look up arrangement in a device memory such as a RAM or other addressable memory device, which will meet speed and memory requirements for a particular device. Color signals $R_c$, $G_c$, $B_c$ are processed to generate address entries to a table which stores a set of transform coefficients, with which the signals $R_c$, $G_c$, $B_c$ may be processed to convert them to C, M, Y, K colorant signals or any multi-dimensional output color space including but not limited to CMYK or spectral data. Values that are not mapped may be determined through interpolation. As described in U.S. Pat. No. 5,305,119 by Rolleston, entitled "Color Printer Calibration Architecture", black addition for under color U.S. Pat. No. 5,483,360, under color removal and gray balance processing may also be combined into the color space transform element. Although these features are not required, they are desirable and are illustrated herein.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values.

To create a complete calibration table, a target with a set of color patches is created, perhaps including desired linearization and black addition. This is done by printing and measuring between 300 and 1000 patches of printer colors distributed throughout the color space, i.e., a large set of printer driving signals are generated, in varying densities of combinations of C, M, Y, K, or other printer colors and used to drive the printer. Of course, greater or lesser numbers of patches or samples may be used. The color of each patch is measured using a spectrophotometer, or possibly the scanner of the system itself, or any other appropriate color measurement device, to determine color in terms of $R_c, B_c, G_c$. The measured colors of these patches are used to build a multi-dimensional look up table (LUT) to map $R_c, B_c, G_c$ defined colors to C, Y, M, K defined colors. Conversions that do not include mapped and measured points may be interpolated or extrapolated. Reference is made to U.S. Pat. No. 5,416,613 which shows and describes a calibration test pattern for this purpose.

A calibration pattern or target consists of a number of patches preferably, although not necessarily, on a single page. Since the minimum size of a patch on a page is determined by external factors (measuring equipment, time to measure all patches, etc.), only a limited number of patches can be printed on a single sheet. In practice, the number of color patches on a single A4 or 8.5×11 page is limited to 200 to 300 patches. With this number of patches, the linearity of the individual C, M, Y, K components has to be determined, as well as the interaction between different components or separations. To get a better feel for the relative number of patches, one should remember that tables with 4096 entries are commonly created and used.

With reference now to FIG. 3, a starting calibration image is conveniently stored in a device memory such as calibration ROM 200, RAM, floppy or the like, or generated on the fly with a predetermined generation function. From the calibration image, a print of the calibration pattern is made at printer 30, to produce an image. Scanner 10 and post scan processor 14 are used to scan the calibration target and produce response signals as a function of sensed density, representing the colors of each scanned patch. Calibration processor 202 reads the responses provided from post scan processor and correlates the response with the input colorant signals, so that a device independent color to colorant mapping may generated.

In standard practice, device independent values may be mapped to device dependent space, perhaps in a manner described in U.S. Pat. No. 5,471,324. Alternatively the method of Po-Chieh Hung, "Colorimetric Calibration for Scanners and Media", SPIE, Vol. 1448, Camera and Input Scanner System, (1991), which describes a method of inverse tetrahedral interpolation, may be used to the same effect as the described Shepard's Method. Of course, other methods are possible. With the look up table derived, it may be stored in LUT 100 at color space transform 20, for use in converting device dependent values received from image creators to device independent printer signals.

In accordance with the invention, an iterative process is used at the calibration processor to generate calibration test patterns including color samples, measure the samples, compare the sample measurements to a printer model, detect deviations from the expected model in portions of the printer gamut, re-generate calibration test patterns with an emphasis on those parts of the printer gamut that exhibit a large deviation from the model, and use the measurements of the re-generated calibration target to create a new color transform LUT.

Generally the invention seeks to generate an initial set of calibration values, for comparison to a printer model. Subsequently, a second set of calibration values is generated, targeted in areas of the gamut of the printer where the calibration values do not respond as the printer model predicted.

In accordance with the invention the first input into the system might be the set of halftone screens that will be used in the characterization. The system examines the halftone screens and determines (a) the likelihood of validity of a chosen printer model; and (b) the likelihood of printer noise. Here, we use noise to identify printer instability at any point in its operational parameters.

A good estimate of these properties can be derived from the dispersity of the halftone dot. Optionally, other parameters (resolution, screen frequency, etc. ) can be included in the process.

A simple measure for dispersity is:

$$D = \left\langle \frac{\sum \text{transitions}}{\sum \text{set\_pixels}} \right\rangle \quad (1)$$

where "<>" denotes some weighted average over different halftone levels.

Transition, here refers to the changes from on-to-off or vice versa in the halftone in both vertical and horizontal direction and pixels. Set_pixel, refers to "on" pixels in a halftone screen cell.

FIG. 4 shows an example of three different halftone dots at two different levels, where the left-most dot is an example dispersed dot, the center dot is a mixed dispersed & clustered dot and the right-most dot is a standard clustered dot. The dispersity values for the dispersed dot are 4 at both levels (16 horizontal transitions and 16 vertical transitions for 8 "on" pixels), for the mixed dot 4 and 3, and for the clustered dot 2 and 1. It should be noted that at the very dark and light end, all dots exhibit a similar dispersity and that the biggest differences will appear in the midtones. For simplicity of implementation, we will use the dispersity at ¼, ½, and ¾ as general indicators, although other values are certainly possible.

One straightforward application of the dispersity measure is the inclusion of color patches to determine output noise and color variation. For halftone schemes with a large dispersity number, some redundant patches are included in different places of the characterization target to allow the determination of the printer variability to the halftone dot. This is an important feature, since dispersed—or stochastic—halftone schemes often exhibit a large-scale variation in their color reproduction, particularly near highlights, and neutrals. Comparing the measured values for the redundant blocks will give a direct estimate of the noise that can potentially be used to alert the user to pick a different halftone screen or to initiate an additional measurement-based characterization.

A model based printer characterization can use different models dependent on the expected printer characteristic. One well-known model is the Neugebauer model that assumes that the output print consists of alternating solid areas of a colorant and white paper. In this model, overprinting generates different colors. The model assumes "sharp" dots i.e., an ideal binary printer for each colorant. The model starts to deviate from the actual printer characteristic for soft dots. As a general rule one can say that the center of a dot behaves as predicted using the Neugebauer model, but that the circumference deviates from the model. The disparity measure given in eq.(1) is actually a measure of the ratio of circumference to area, and therefore directly related to the likely validity of the Neugebauer model. It is expected that a low disparity value would indicate good validity of the Neugebauer model.

In contrast to the Neugebauer model, another printer model can be generated using Beer's law. It assumes that the output can be modeled as a continuous tone process that is additive in spectral density space. Beer's model is highly likely to be valid for print engines that print continuous tone data. However, one has to remember that the edges of a soft dot are a very good approximation to continuous tone data. Correspondingly, a combination of the Neugebauer model for the "flat" portions of the dot profile, and Beer's law for the soft edges of the dots, should be a good approximation for halftone screens that have a high dispersity value.

Yet another approach is to retain one model, and use the dot dispersity value to decide upon a set of additional color patches for refining the model. In the case where the dot dispersity value is high, we would expect the prediction accuracy of the Neugebauer model to be inadequate; and hence need to include a relatively large number of refinement patches in order to track the true response of the printer. In the proposed method, we use, for low dispersity values, a characterization target including colors required for the cellular Neugebauer model, i.e. C, M, Y, K stepwedges, and 81 patches resulting from 0%, 50%, and 100% combinations of CMYK (the latter are the so called Neugebauer primaries). Also, an additional set of refinement colors is included. These are chosen so that, in combination with the Neugebauer primaries, they provide a uniform sampling of CMYK space.

A target for the high dispersity case would include a different (and larger) set of refinement colors in order to provide a finer sampling of CMYK space. In addition, each refinement color might be repeated on multiple locations to check for noise sensitivity.

Another important aspect in the creation of the characterization target is the dot-overlap of the specified halftones. In this case, we can measure the dot-overlap variation of the different separations under separation shift. The reason for this measurement is the estimation of the misregistration sensitivity of the characterization. As in the noise case, the characterization target will have a set of redundant patches to test the reproducibility of the colors. It has been noted that some misregistrations lead to an inconsistent dot overlap as a function of the location on the page, while other misregistrations are better tested by printing multiple characterization sheets.

The previous sections described an embodiment of this invention that was sensitive to the halftone description. It should be noted that the described invention can also be embodied in a system that does not incorporate halftone knowledge, or that does not use halftones, such as contone printers. The main feature of the described invention is the dynamic creation of calibration sheets based on an initial calibration of the output device, and a model of the expected behavior of the device.

In FIG. 5, a plot of two axes in color space is illustrated. The solid curve labeled "Modeled Response" demonstrates a possible expected response based on a combination of printer models. For the purposes of demonstration, a simplistic example curve is provided. The dashed curve demonstrates a possible response. Many areas of the two curves demonstrate reasonable accuracy of the printer model, and hence, reasonable assurance of the accuracy of the measurements. Some areas, however, show wide divergence of expected performance versus measured performance. Color charts with colors selected from these color ranges, at closer intervals, and possible redundant instances, are generated to measure more accurately in these areas.

Thresholds for comparison of the printer model to measured printer performance can be established through empirical methods. Deviation from the model can be characterized in a number of ways, including a simple differencing operation.

It may also be desirable to update the model based on the valid measurement data, so as to ensure that the model continues to be a reliable indicator of the printer response.

As an adjunct to this careful identification of areas for further measurement, fewer primary measurements need to be made. Since the primary measurement provides only an initial example for confirmation of the model as representing printer operation, those areas in which the model is a good predictor of printer operation need only be measured by a few samples. The net result is that once a model is confirmed that represents printer operation well, only a few samples need to be made in good areas, while the predominant amount of samples can be made in areas that vary with printer stress.

FIG. 6 is a flow chart illustrating the inventive method of calibration. At step 500, an initial target $T_0$ is printed. For step 502, the printer response to target $T_0$ is measured. The response is compared to a chosen printer model at step 504. At step 506, a determination is made to discover whether the comparison shows a deviation that is more than an acceptable amount. If so, from the comparison, areas of concern are identified at step 508. Target $T_N$ is generated reselecting the area of concern, at step 510. The calibration target printing process is iterated. If step 506 provides a comparison which demonstrates the printer is performing as predicted, the derived calibration data values are directed to calibration processor 202, to generate a color transform LUT 100. Of course, it may be that the operation of the printer does not converge at the predicted model, in which case, a limited set of iterations, perhaps only one, are required before the data will be directed to the calibration processor.

It should be understood that $R_c, B_c, G_c$ input is used as example only, and that any other calorimetric description might be used on the input. It should also be noted that the color measurement instrumentation might be partly or entirely incorporated into the color printer. In such instances, the dynamic color calibration sheet might be an actually printed piece of paper, or a known part or area of an intermediate image carrier. It is appreciated that reducing the number of patches to be measured is similarly important in manual and automatic calibration situations.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for calibrating a printer comprising:

printing a first set of color samples with said printer selected to reflect at least a portion of a printer gamut;

initially measuring each printed color sample in said set to determine said printer's calorimetric response thereto;

comparing said colorimetric response with a predictive model of printer behavior for said printer gamut;

for at least one portion of said calorimetric response which differs from predicted printer behavior, generating a new set of color samples, reflecting said portion of said calorimetric response, for printing by said printer;

secondarily measuring each of said printed new set of color samples set to determine said printer's calorimetric response thereto;

using said initial measurements and said secondary measurements to generate a color calibration table for use by said printer in converting device independent colors to device dependent colors.

2. The method as defined in claim 1, wherein said first set of color samples is selected to be dispersed throughout the printer gamut.

3. The method as defined in claim 1, wherein said initial measurement is made in a CIE color space coordinate system, or a color space coordinate system which is an analytic transform thereof.

4. The method as defined in claim 1, wherein said predictive model of printer behavior is based at least partially on a Neugebauer function.

5. The method as defined in claim 1, where said predictive model of printer behavior is based at least partially on a Beer's Law function.

6. The method as defined in claim 1, wherein said predictive model of printer behavior is based on a combination of printer models.

7. The method as defined in claim 1, wherein said at least one portion of said calorimetric response differs from predicted printer behavior by a threshold amount, before invoking generation of a new set of color samples.

8. The method of claim 1, wherein said new set of color samples represents a selection of samples from a subset of said printer gamut, less than said printer gamut.

9. The method as defined in claim 1, wherein said secondary measurement is made in a CIE color space coordinate system, or a color space coordinate system which is an analytic transform thereof.

10. The method as defined in claim 1, wherein said calibration table is a look up table mapping device independent colors to device dependent colors, for use by an interpolation process.

11. The method as defined in claim 1, where said printing step is accomplished exclusively within said printer.

12. The method as defined in claim 11, wherein said printing step prints color samples on a reusable surface within said printer.

13. A method for calibrating a printer comprising:

printing a first set of color samples representative of at least a portion of a printer gamut;

comparing said first set of color samples with a predictive model of printer behavior for said portion of said printer gamut;

generating a new set of color samples in areas where a difference between said first set of color and said predictive model is greater than desire;

using said first set of color samples and said new set of color samples to calibrate said printer.

14. The method as defined in claim 13, wherein said first set of color samples is selected to be dispersed throughout the printer gamut.

15. The method as defined in claim 13, wherein said predictive model of printer behavior is based at least partially on a Neugebauer function.

16. The method as defined in claim 13, where said predictive model of printer behavior is based at least partially on a Beer's Law function.

17. The method as defined in claim 13, wherein said predictive model of printer behavior is based on a combination of printer models.

18. The method of claim 13, wherein said new set of color samples represents a selection of samples from a subset of said printer gamut, less than said printer gamut.

19. The method as defined in claim 13, wherein said calibration of said printer includes generating a look up table mapping device independent colors to device dependent colors, for use by an interpolation process.

* * * * *